(12) United States Patent
Ikeda et al.

(10) Patent No.: US 11,141,812 B2
(45) Date of Patent: Oct. 12, 2021

(54) FRICTION STIR WELDING METHOD AND MANUFACTURING METHOD OF WELDING STRUCTURE

(71) Applicant: Mitsubishi Electric Corporation, Tokyo (JP)

(72) Inventors: Takuya Ikeda, Tokyo (JP); Muneaki Mukuda, Tokyo (JP); Keisuke Murase, Tokyo (JP); Seiiyu Ishimoto, Tokyo (JP)

(73) Assignee: MITSUBISHI ELECTRIC CORPRATION, Tokyo (JP)

( * ) Notice: Subject to any disclaimer, the term of this patent is extended or adjusted under 35 U.S.C. 154(b) by 289 days.

(21) Appl. No.: 16/470,371

(22) PCT Filed: Feb. 1, 2018

(86) PCT No.: PCT/JP2018/003418
§ 371 (c)(1),
(2) Date: Jun. 17, 2019

(87) PCT Pub. No.: WO2018/150891
PCT Pub. Date: Aug. 23, 2018

(65) Prior Publication Data
US 2019/0366474 A1    Dec. 5, 2019

(30) Foreign Application Priority Data
Feb. 17, 2017    (JP) .............................. JP2017-027493

(51) Int. Cl.
*B23K 20/12*    (2006.01)
*B23K 20/26*    (2006.01)

(52) U.S. Cl.
CPC ............ *B23K 20/26* (2013.01); *B23K 20/126* (2013.01); *B23K 20/1255* (2013.01)

(58) Field of Classification Search
CPC ............ B23K 20/122; B23K 2101/045; B23K 33/00; B23K 20/1265; B23K 20/1225
(Continued)

(56) References Cited

U.S. PATENT DOCUMENTS 6,193,137 B1 *   2/2001   Ezumi ................ B23K 20/122
                                                        228/112.1
6,250,037 B1 *   6/2001   Ezumi ................ B21C 23/145
                                                          52/592.1
(Continued)

FOREIGN PATENT DOCUMENTS

CN    1275450 A    12/2000
CN    1354064 A     6/2002
(Continued)

OTHER PUBLICATIONS

Office Action dated Dec. 2, 2020, issued in corresponding Chinese Patent Application No. 201880007205.9, 23 pages including 11 pages of English translation.
(Continued)

*Primary Examiner* — Erin B Saad
(74) *Attorney, Agent, or Firm* — Buchanan Ingersoll & Rooney PC

(57) ABSTRACT

A friction stir welding method in which a first member to be welded and a second member to be welded and having a first step portion are welded by friction stir welding using a welding tool includes the steps of arranging the first member to be welded on a step supporting surface of the first step portion with a gap between the first member to be welded and a side surface of the first step portion, pushing the welding tool into the first member to be welded from a surface of the first member to be welded while rotating the welding tool and inserting the welding tool until reaching the step supporting surface of the second member to be welded and stirring the first member to be welded and the (Continued)

second member to be welded by rotating the welding tool to form a welding part.

14 Claims, 11 Drawing Sheets

(58) Field of Classification Search
USPC .............................. 228/112.1, 2.1, 101, 249
See application file for complete search history.

(56) References Cited

U.S. PATENT DOCUMENTS

| | | | |
|---|---|---|---|
| 6,311,889 B1 | 11/2001 | Ezumi et al. | |
| 6,599,641 B1 * | 7/2003 | Nakamura | B23K 20/122 428/593 |
| 6,622,904 B2 * | 9/2003 | Ezumi | B23K 20/122 228/112.1 |
| 6,698,153 B2 * | 3/2004 | Ezumi | B23K 33/00 52/690 |
| 6,722,286 B2 * | 4/2004 | Okamura | B23K 33/00 105/396 |
| 9,919,378 B2 * | 3/2018 | Silvanus | B23K 20/122 |
| 2002/0060237 A1 | 5/2002 | Ezumi et al. | |
| 2003/0192941 A1 * | 10/2003 | Ishida | B23K 20/1245 228/112.1 |
| 2005/0247756 A1 * | 11/2005 | Frazer | B64C 3/26 228/101 |
| 2016/0325374 A1 | 11/2016 | Hori et al. | |
| 2018/0141152 A1 | 5/2018 | Hori et al. | |
| 2018/0264584 A1 | 9/2018 | Hori et al. | |
| 2018/0272479 A1 | 9/2018 | Hori et al. | |

FOREIGN PATENT DOCUMENTS

| | | |
|---|---|---|
| DE | 202012001704 U1 | 5/2013 |
| DE | 102012001877 A1 | 8/2013 |
| JP | H1158039 A | 3/1999 |
| JP | 2001207587 A | 8/2001 |
| JP | 2002153976 A | 5/2002 |
| JP | 2003094178 A | 4/2003 |
| JP | 2003136259 A | 5/2003 |
| JP | 2010140951 A | 6/2010 |
| WO | 2015107716 A1 | 7/2015 |
| WO | 2016072211 A1 | 5/2016 |

OTHER PUBLICATIONS

Office Action dated Jun. 23, 2020, issued in corresponding Japanese Patent Application No. 2018-568102, 10 pages uncluding 5 pages of English translation.
International Search Report (PCT/ISA/210) dated Apr. 17, 2018, by the Japan Patent Office as the International Searching Authority for International Application No. PCT/JP2018/003418.
Written Opinion (PCT/ISA/237) dated Apr. 17, 2018, by the Japan Patent Office as the International Searching Authority for International Application No. PCT/JP2018/003418.

* cited by examiner

FRICTION STIR WELDING METHOD AND MANUFACTURING METHOD OF WELDING STRUCTURE

TECHNICAL FIELD

The present application relates of a friction stir welding method and a manufacturing method of a welding structure.

BACKGROUND ART

Friction stir welding (FSW) is one of metal welding techniques, which is a method in which a rotary tool called a tool is inserted into a welding part of a member to be welded and moved along a welding line while rotating the tool, then, the welded part is stirred to thereby realize solid phase welding. As the member to be welded can be welded under a melting temperature in the friction stir welding, there are many advantages such as reduction in deterioration of strength or deformation at the welding part due to transformation of a metal structure.

A shape of the welding part in the friction stir welding depends on a shape of the tool. A common tool is formed by a large-diameter portion called a shoulder and a portion installed at a tip end thereof called a probe.

In the related-art friction stir welding, the probe is inserted into a metal as the member to be welded, and welding is performed while suppressing the metal scraped out at that time by the shoulder, therefore, a welding width depends on a shoulder diameter. Accordingly, it is necessary to reduce the shoulder diameter of the tool to be used for narrowing the welding width. However, when the shoulder diameter is reduced, it is difficult to sufficiently suppress the metal scraped out at the time of stirring and the metal scraped out from an upper surface of the member to be welded at the time of stirring becomes a large amount of burrs, which causes a defect.

In a related-art rotary tool for friction stirring, a tool having a special shape provided with a thread groove in the probe in which the area of a thread root is larger than the area of a thread crest is used, thereby realizing welding with a small welding width without pushing the shoulder to a welding metal (for example, refer to Patent Literature 1).

CITATION LIST

Patent Literature

Patent Literature 1: JP-A-2003-136259

SUMMARY OF INVENTION

Technical Problem

However, in the related-art rotary tool for friction stirring and a processing method using the same, there are problems that a range of conditions in which welding with no defect can be performed is narrow and welding speed is low. There is also a problem that strength of the probe is deteriorated due to effects of the shape of the thread groove provided in the probe.

The present application has been made to solve the above problems and an object of the present application is to provide a friction stir welding method and a manufacturing method of a welding structure capable of forming a welding part with a narrow welding width without using a welding tool with a special shape.

Solution to Problem

A friction stir welding method disclosed in the present application is a friction stir welding method in which a first member to be welded formed of metal or resin and a second member to be welded formed of metal or resin and having a first step portion are arranged in a lapped manner and welded by friction stir welding using a welding tool, which includes the steps of arranging the first member to be welded on a step supporting surface of the first step portion with a gap between the first member to be welded and a side surface of the first step portion, pushing the welding tool into the first member to be welded from a surface on the opposite side of a back surface of the first member to be welded contacting the step supporting surface while rotating the welding tool and inserting the welding tool until reaching the step supporting surface of the second member to be welded and stirring the first member to be welded and the second member to be welded by rotating the welding tool to form a welding part.

Advantageous Effects of Invention

The friction stir welding method disclosed in the present application can reduce metal and so on stirred in an upper surface direction of the first member to be welded and can sufficiently suppress the stirred metal and so on even by a welding tool with a thin shoulder diameter by arranging the first member to be welded on the second member to be welded having the first step portion and providing the gap between the side surface of the first step portion and the first member to be welded. Accordingly, the welding part with a small welding width can be formed without using the welding tool with a special shape.

DESCRIPTION OF EMBODIMENTS

Embodiment 1

Hereinafter, Embodiment 1 will be explained with reference to the drawings.

Figure 1:
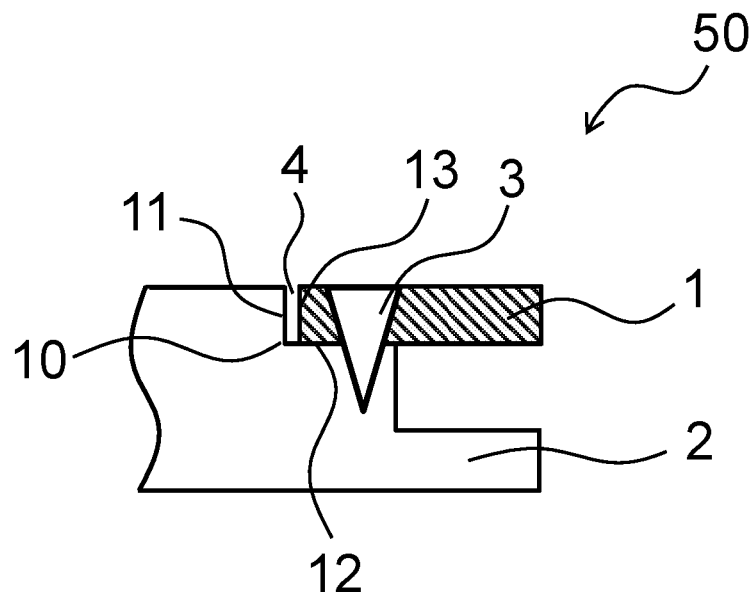
FIG. 1 is a cross-sectional view for explaining a friction stir welding method according to Embodiment 1.

FIG. 1 is a cross-sectional view for explaining a friction stir welding method according to Embodiment 1. As shown in FIG. 1, a welding structure 50 according to Embodiment 1 includes a first member to be welded 1 formed of metal or resin and a second member to be welded 2 formed of metal or resin and having a first step portion 10. The first member to be welded 1 is arranged on a step supporting surface 12 in the first step portion 10 of the second member to be welded 2. A gap 4 is formed between a side surface 11 of the first step portion 10 of the second member to be welded 2 and an outline side surface 13 of the first member to be welded 1. Moreover, a friction stir welding part 3 formed by being stirred by a welding tool 5 is provided at a lapped part of the first member to be welded 1 and the second member to be welded 2. There is a case where a welding metal flows into the gap 4 by forming the friction stir welding part 3 as described later.

As shown in FIG. 1, the friction stir welding method according to Embodiment 1 includes a step of arranging the first member to be welded 1 on the step supporting surface 12 of the first step portion 10 with the gap 4 between the first member to be welded 1 and the side surface 11 of the first step portion 10, a welding tool insertion step of pushing the welding tool 5 into the first member to be welded 1 from a surface on the opposite side of aback surface of the first member to be welded 1 contacting the step supporting surface 12 while rotating the welding tool 5 and inserting the welding tool 5 until reaching the step supporting surface 12 of the second member to be welded 2 and a stirring step of stirring the first member to be welded 1 and the second member to be welded 2 by rotating the welding tool 5 to from the friction stir welding part 3.

The gap 4 is provided between the side surface 11 of the first step portion 10 provided in the second member to be welded 2 and the outline side surface 13 of the first member to be welded 1, thereby forming a heat insulating layer at that portion. As heat of the first member to be welded 1 tends to be confined in the portion of the heat insulating layer, the temperature is increased and the softened welding metal easily flows toward the gap 4. As a result, the metal and so on to be stirred in an upper surface direction of the first member to be welded are reduced, and the stirred metal and so on can be sufficiently suppressed even when the welding tool 5 with a small shoulder diameter is used. Accordingly, the friction stir welding part 3 with a small welding width can be formed without using the welding tool 5 having a special shape.

In particular, the friction stir welding method according to Embodiment 1 is suitable when the first member to be welded 1 or the second member to be welded 2 is made of an aluminum alloy or copper. The second member to be welded 2 is, for example, a jacket of a box-shaped cooler and the first member to be welded 1 is, for example, a plate-shaped component such as a heat sink.

Here, an example of actual welding experiment by the friction stir welding method is shown below.

Material to be welded: A6063-A6063, a plate thickness 3 mm, lap joint

Tool: shoulder diameter 5 mm, probe length 3.2 mm

Number of rotations: 1,500 to 3,000 rpm

Welding speed: 200 to 800 mm/min

In the friction stir welding method according to Embodiment 1, the friction stir welding part 3 with no defect is formed by the above material and welding conditions. As the stirred welding metal easily flows into the gap 4, occurrence of burrs can be suppressed. The shape of a probe 7 in the above example of welding experiment is a truncated-cone shape, a diameter of abase of the probe 7 is ɸ3 mm, and a diameter of a tip end of the probe 7 is ɸ2 mm. The welding tool 5 having a spiral groove corresponding to a M3 screw in the probe 7 is used and a rotation direction of the welding tool 5 is an opposite (reverse screw) direction to the spiral groove provided in the probe 7 for increasing a stirring force.

Figure 3A:
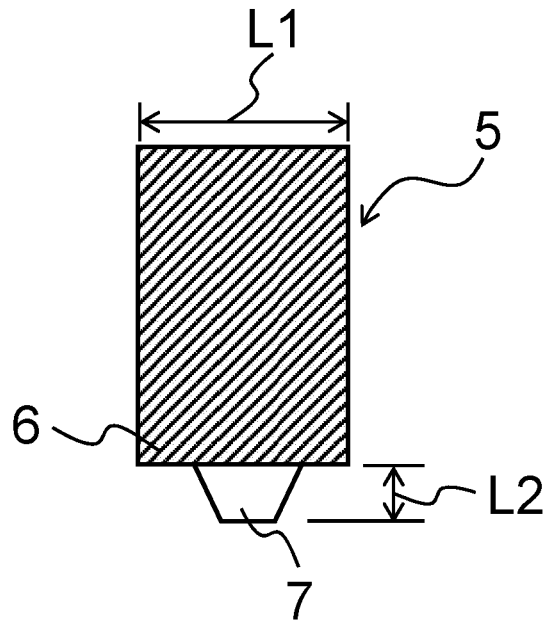
FIG. 3A is a cross-sectional view showing a welding tool used for a common friction stir welding method.
Figure 3B:
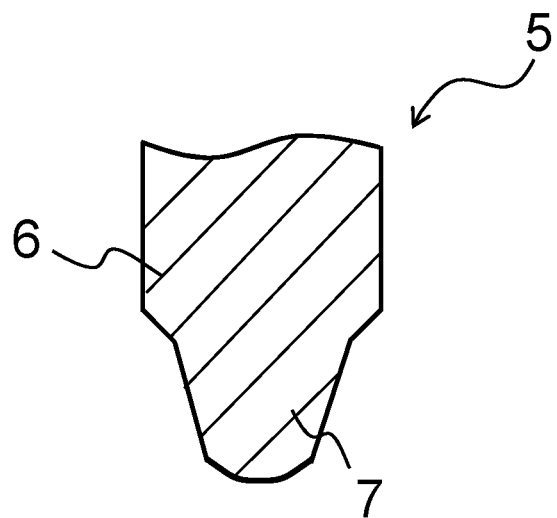
FIG. 3B is a cross-sectional view showing a welding tool used for a common friction stir welding method.

FIG. 3A and FIG. 3B are cross-sectional views showing a welding tool used for a common friction stir welding method.

As shown in FIG. 3A, the welding tool 5 used for the friction stir welding method is formed by a large diameter portion called a shoulder 6 and a small diameter portion provided at a tip end thereof called a probe 7. The probe 7 is inserted into a metal to be welded and welding is performed while suppressing the welding metal scraped out from an upper surface of the welding metal at that time by the shoulder 6. Though the shoulder 6 is shown in a cylindrical shape and the probe 7 is shown in a truncated cone shape in FIG. 3A, other shapes can be also adopted. For example, the shoulder 6 may have a shape with an upward-convex curved surface or a tapered shape, and the probe 7 may have a cylindrical shape, a shape with a curved surface at the tip end or the like.

A welding shape of the friction stir welding depends on the shape of the welding tool 5. The welding width is determined by a diameter L1 of the shoulder 6 and a welding depth is determined by a length L2 of the probe 7. In the common welding tool 5, the diameter L1 of the shoulder 6 is approximately three to six times of the length L2 of the probe 7. Therefore, the welding width becomes larger than the welding depth in the friction stir welding in many cases. As the welding width becomes wide in the common friction stir welding, there are disadvantage that deformation is increased and that it is difficult to be applied to a welding part with a narrow range.

Accordingly, in order to apply the friction stir welding to a portion with a narrow welding range, a friction stir welding method by using the welding tool 5 with a high aspect ratio (welding depth/welding width) is necessary. That is, it is necessary to reduce the diameter L1 of the shoulder 6 without changing the length L2 of the probe 7. However, when the diameter L1 of the shoulder 6 is reduced with respect to the length L2 of the probe 7, for example, when the diameter L1 of the shoulder 6 is reduced to be one times to twice as long as the length L2 of the probe 7, it is difficult to suppress the stirred metal, and a large amount of metal stirred from the upper surface direction of the first member to be welded 1 is generated as burrs, which causes a defect (voids) inside the member.

As a friction stir welding method for welding the portion with the narrow welding range, a method of using the welding tool 5 shown in FIG. 3B is proposed. This is a method of performing friction stir welding without allowing the shoulder 6 to contact the member to be welded by devising the shape of the thread groove provided in the probe 7. As the shoulder 6 does not contact the member to be welded, welding of a narrow width can be realized.

However, the method of using such welding tool 5 has disadvantages that the range of conditions for welding with no defect is narrow and welding speed is not high. As there is no heat input by the shoulder 6, a condition of high-speed rotation is necessary for obtaining frictional heat required for friction stir welding. The friction stir welding with high-speed rotation has a disadvantage that the lifetime of the welding tool 5 is shortened as abrasion of the welding tool 5 is severe.

As described above, the friction stir welding method according to Embodiment 1 is provided with the gap 4 between the side surface 11 of the first step portion 10 of the second member to be welded 2 and the outline side surface 13 of the first member to be welded 1 for compensating the above disadvantages. Accordingly, the metal and so on stirred in the upper surface direction of the first member to be welded 1 are reduced, and the friction stir welding part 3 with a narrow welding width can be formed without restrictions in the shape of the welding tool 5.

Embodiment 2

Figure 2:
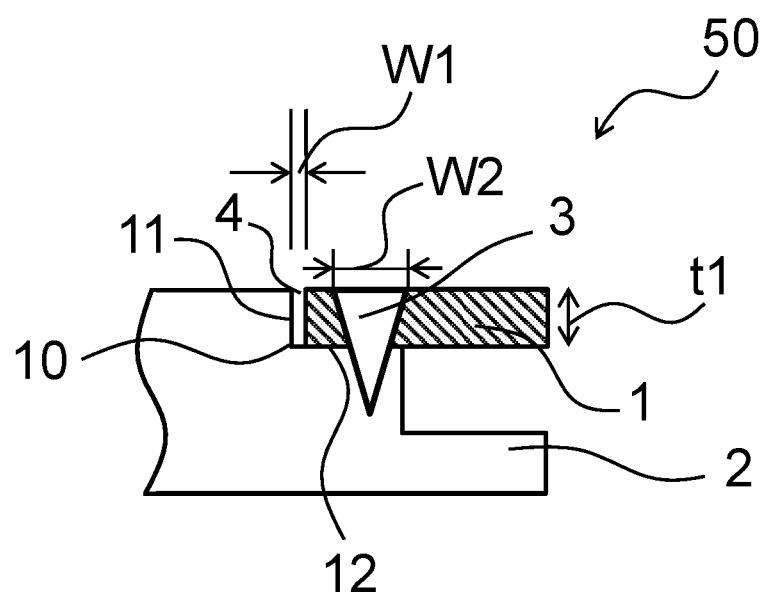
FIG. 2 is a cross-sectional view for explaining a friction stir welding method according to Embodiment 2.
Figure 4:
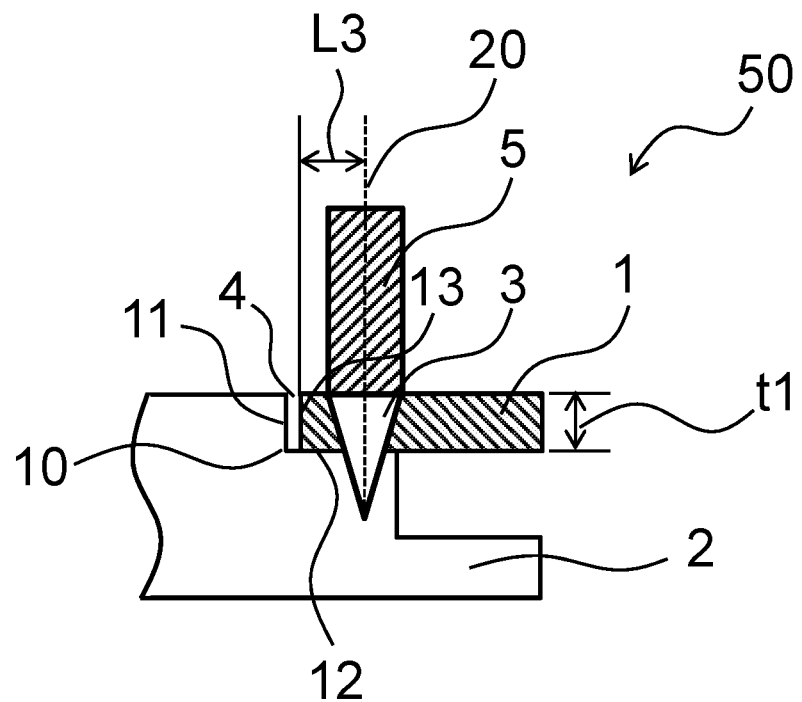
FIG. 4 is a cross-sectional view for explaining the friction stir welding method according to Embodiment 2.

FIG. 2 is a cross-sectional view for explaining a friction stir welding method according to Embodiment 2. FIG. 4 is a cross-sectional view for explaining the friction stir welding method according to Embodiment 2. The same symbols as those in Embodiment 1 indicate the same structures as those in Embodiment 1, and thus they are not explained in Embodiment 2. As shown in FIG. 2, in the welding structure 50 according to Embodiment 2, a width W1 of the gap 4 is limited in a range of widths from 0.03 times or more to 0.2 times or less of a plate thickness t1 of the first member to be welded 1 and a welding width W2 is limited in a range of widths from 0.5 times or more to twice or less of the plate thickness t1 of the first member to be welded 1. The designation of these dimensions influences the plate thickness t1 in the friction stir welding part 3.

Also in the friction stir welding according to Embodiment 2, the metal stirred on the upper surface of the first member to be welded 1 is reduced by letting the stirred welding metal and so on escape into the gap 4, and the friction stir welding part 3 can be formed without a defect even when the welding tool 5 with a small diameter L1 of the shoulder 6 is used. Accordingly, when the gap 4 becomes wider than 0.2 times of the plate thickness t1 of the first member to be welded 1, the welding metal flowing into the gap 4 is increased and the plate thickness t1 in the friction stir welding part 3 becomes thin. As a result, it is difficult to obtain a prescribed welding strength. Conversely, when the gap 4 becomes narrower than 0.03 times of the plate thickness t1 of the first member to be welded 1, it has been confirmed that an amount of welding metal which can flow into the gap 4 is reduced and advantages of the structure according to Embodiment 2 are reduced, which causes a defect.

The welding width W2 largely affects an amount of welding metal, and when the welding width W2 is larger than twice as thick as the plate thickness t1 of the first member to be welded 1, the gap 4 is not capable of hold the welding metal and the welding metal flows out from the upper surface of the first member to be welded 1, which causes a defect. When the welding width W2 is smaller than 0.5 times as thick as the plate thickness t1 of the first member to be welded 1, the welding metal flowing into the gap 4 is reduced and the gap 4 is not sufficiently filled. In such state, the welding metal is stirred freely and an internal defect may occur.

In view of the above, it is preferable in the friction stir welding method according to Embodiment 2 that the width W1 of the gap 4 is set to a range of widths from 0.03 times or more to 0.2 times or less of the plate thickness t1 of the first member to be welded 1 and that the welding width W2 is set to a range of widths from 0.5 times or more to twice or less of the plate thickness t1 of the first member to be welded 1.

FIG. 4 is a cross-sectional view for explaining the friction stir welding method according to Embodiment 2, which is the cross-sectional view showing a position where the welding tool 5 is inserted. As shown in FIG. 4, it is preferable that a length L3 from a central axis 20 of the welding tool 5 as the insertion position of the welding tool 5 to the outline side surface 13 of the first member to be welded 1 is set to a range of lengths 0.5 times or more to 1 times or less of the plate thickness t1 of the first member to be welded 1. When the insertion position of the welding tool 5 becomes larger than 1 times of the plate thickness t1 of the first member to be welded 1 and gets away from the gap 4, the stirred welding metal is separated from the gap 4, therefore, the welding metal does not flow into the gap 4 and the welding metal may flow out from the upper surface of the first member to be welded 1 as burrs. As a result, there is a case where an internal defect occurs and the good friction stir welding part 3 is not formed.

Furthermore, when the insertion position of the welding tool 5 becomes smaller than 0.5 times of the plate thickness t1 of the first member to be welded 1 and comes close to the gap 4, the side surface 11 of the second member to be welded 2 may also be stirred. When the second member to be welded 2 is also stirred, the side surface 11 of the first step portion 10 is softened and is not capable of suppressing the stirred welding metal.

Accordingly, in Embodiment 2, the welding tool 5 is inserted at the position where the length L3 from the central axis 20 of the welding tool 5 to the outline side surface 13 of the first member to be welded 1 is in the range of lengths from 0.5 times or more to 1.0 times or less of the plate thickness of the first member to be welded 1 in the stirring step, and the welding tool 5 is moved along an outline of the first member to be welded 1 while keeping the insertion position, thereby forming the friction stir welding part 3. Embodiment 2 has an effect of suppressing the welding metal by the side surface 11 of the first step portion 10 in the second member to be welded 2, which can suppress heat input to the second member to be welded 2. In Embodiment 2, the relation between the region to which friction stir welding is performed and the gap 4, or the position where the welding tool 5 is inserted influences the welding quality. The relation is important for forming the friction stir welding part 3 with a high aspect ratio (welding depth/welding width).

Embodiment 3

Figure 5:
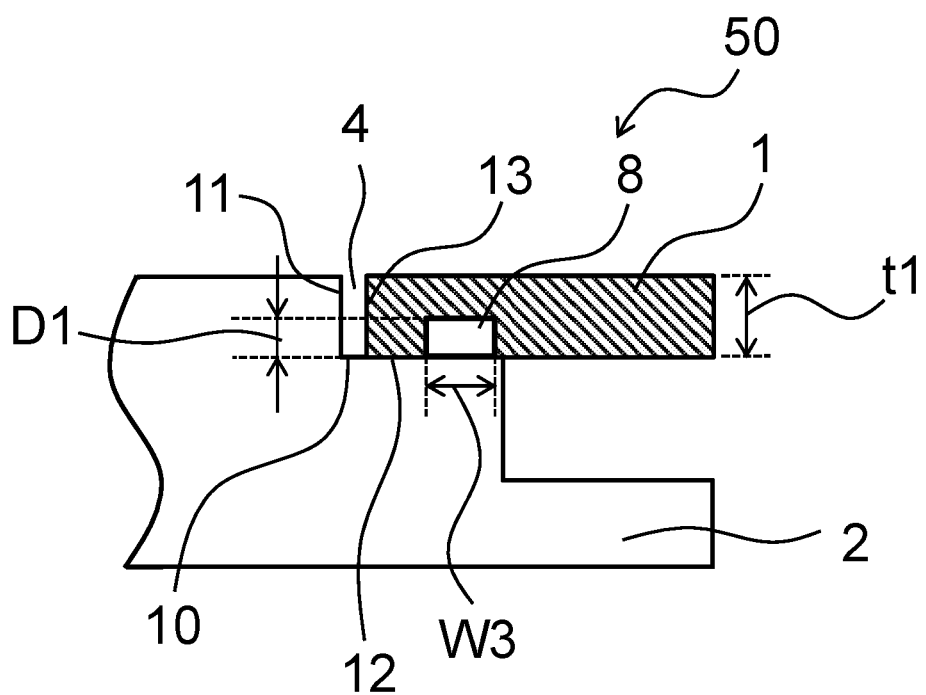
FIG. 5 is a cross-sectional view for explaining a friction stir welding method according to Embodiment 3.

FIG. 5 is a cross-sectional view for explaining a friction stir welding method according to Embodiment 3. As shown in FIG. 5, a space 8 is provided along the outline of the first member to be welded 1 on a back surface side of the first member to be welded 1 contacting a step supporting surface 12 in Embodiment 3. The space 8 is formed so that a width W3 is 0.5 times or more to 1 times or less of the plate thickness t1 of the first member to be welded 1 and a depth D1 is 0.3 times or more to 0.8 times or less of the plate thickness t1. The first member to be welded 1 is lapped over the second member to be welded 2 and the friction stir welding is performed along the space 8 to thereby form the friction stir welding part 3.

Accordingly, a heat insulating layer can be formed on the opposite side of the gap 4 existing between the outline side surface 13 of the first member to be welded 1 and the side surface 11 of the first step portion 10 of the second member to be welded 2. As the welding metal easily flows into the space 8, the welding metal stirred on the upper surface side of the first member to be welded 1 is reduced and the friction stir welding part 3 can be formed without a defect even when the welding tool 5 with a thin shoulder 6 is used. Moreover, the space 8 is provided in FIG. 5, therefore, the gap 4 can be formed with a minimum width. Note that the same advantages can be obtained by forming a similar space on the second member to be welded 2 side in the lapped part between the first member to be welded 1 and the second member to be welded 2.

Embodiment 4

Figure 6:
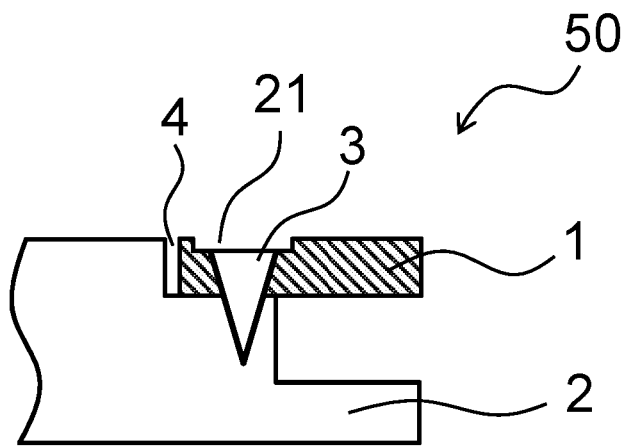
FIG. 6 is a cross-sectional view for explaining a friction stir welding method according to Embodiment 4.

FIG. 6 is a cross-sectional view for explaining a friction stir welding method according to Embodiment 4. As shown in FIG. 6, a structure in Embodiment 4 is the same as that of the welding structure 50 shown in FIG. 1, in which an upper surface side of the friction stir welding part 3 is removed from the welding structure 50 shown in FIG. 1 along the friction stir welding part 3 to form a groove portion 21.

In the friction stir welding part 3, burrs may occur in a portion contacting the shoulder 6 of the welding tool 5. As the friction stir welding with a high aspect ratio (welding depth/welding width) is performed by reducing the diameter L1 of the shoulder 6 in Embodiment 4, it is difficult to sufficiently suppress stirred welding metal by the shoulder 6 and occurrence of burrs is particularly increased. Moreover, a welding surface tends to be rough when the diameter L1 of the shoulder 6 is thin. Accordingly, it is desirable to remove the upper surface of the friction stir welding part 3 to eliminate burrs. As an amount of removal, it is preferable to remove the upper surface so that 60 to 95% of the plate thickness t1 of the first member to be removed 1 remains. When an amount of burrs higher than that is removed, the plate thickness in the friction stir welding part 3 becomes thin and welding strength is deteriorated. In Embodiment 4, after the first member to be welded 1 is lapped over the step supporting surface 12 of the second member to be welded 2 and friction stir welding is performed, the upper surface of the welding part is removed along the friction stir welding part so that 60 to 95% of the plate thickness t1 of the first member to be removed 1 remains to thereby form the groove portion 21 along the welding part of the first member to be welded 1. In a case where the friction stir welding method according to Embodiment 4 is applied to products requiring water tightness and air tightness, a method of sealing the groove portion 21 formed by removing the upper surface of the friction stir welding part 3 is also effective.

Embodiment 5

Figure 7:
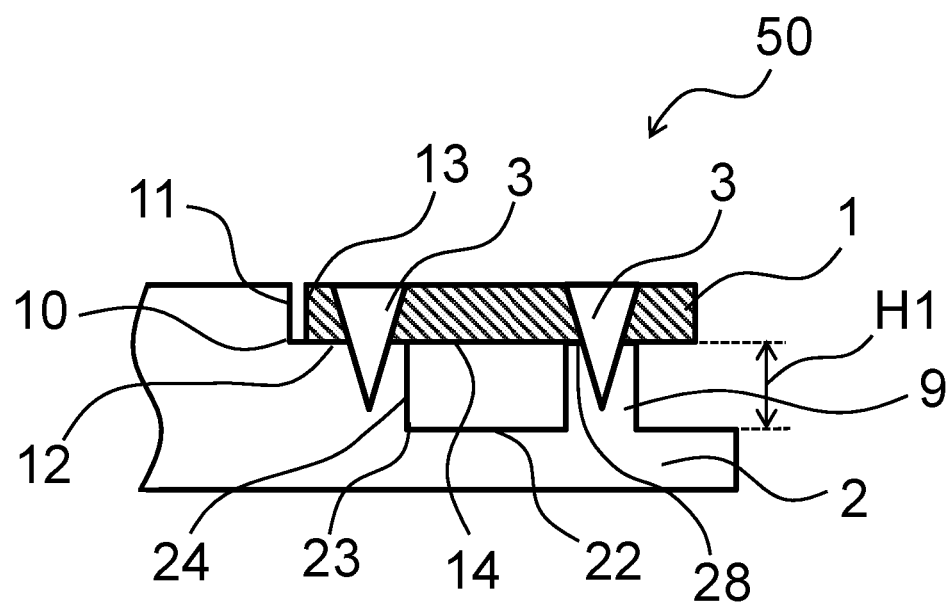
FIG. 7 is a cross-sectional view for explaining a friction stir welding method according to Embodiment 5.

FIG. 7, FIG. 8, FIG. 9 and FIG. 10 are cross-sectional views for explaining a friction stir welding method according to Embodiment 5. A structure in FIG. 7 is basically the same as that in FIG. 1, in which the second member to be welded 2 has a second step portion 23 provided at an end portion of the step supporting surface 12 of the first step portion 10. The second step portion 23 includes a step wall surface 24 and a step bottom surface 22. The step wall surface 24 exists between the step supporting surface 12 of the first step portion 10 and the step bottom surface 22 of the second step portion 23, the step wall surface 24 is connected to an end portion of the first step portion 10 and the step bottom surface 22 is connected to an end portion of the step wall surface 24.

The second member to be welded 2 has a first rib structure 9 on the step bottom surface 22 so as to be independent of the step supporting surface 12. It is desirable that a height H1 of the first rib structure 9 is equivalent to a height of the step supporting surface 12 of the first step portion 10.

In the friction stir welding method according to Embodiment 5, after the first member to be welded 1 is arranged on a first-rib step supporting surface 28 as an upper surface of the first rib structure 9 and the step supporting surface 12, the first member to be welded 1 is lapped over the first-rib step supporting surface 28 as the upper surface of the first rib structure 9 and friction stir welding is performed first, then, the step supporting surface 12 of the second member to be welded 2 and the first member to be welded 1 are welded by friction stir welding along the outline of the first member to be welded 1.

As the first-rib step supporting surface 28 as the upper surface of the first rib structure 9 and the first member to be welded are welded by friction stir welding, the first member to be welded 1 is restrained and the position of the gap 4 between the first member to be welded 1 and the side surface 11 of the second member to be welded 2 is fixed. Accordingly, an advantage that the gap 4 is held at a suitable position can be obtained.

The friction stir welding method according to Embodiment 5 is suitable for, for example, a sealed container in which four edges of the first member to be welded 1 is welded by sealing and to which an internal pressure is added. For example, the box-shaped second member to be welded 2 such as a cooler is symmetrical around the first rib structure 9, the friction stir welding part 3 and the gap 4 exist also on the opposite side (right side in the drawing) of the first rib structure 9 (not shown). Accordingly, the first rib structure 9 is welded first by friction stir welding, thereby holding both the friction stir welding parts 3 and the gaps 4 of the first step portion 10 existing right and left around the first rib structure 9 at suitable positions. When one of the friction stir welding parts 3 of the first step portion 10 is formed first, the first member to be welded 1 is pulled to the friction stir welding part 3 formed first, which increases the gap 4 on the other side.

When the first rib structure 9 does not exist, the first member to be welded 1 contracts to a direction where the first member to be welded 1 is welded first at the time of welding the first member to be welded 1, which increases the gap 4 on the surface of the opposite side. On the other hand, the first rib structure 9 is provided and the first rib structure 9 is welded first, thereby fixing the first member to be welded 1 and holding the gap 4 properly. Accordingly, the friction stir welding with a high aspect ratio can be stably performed.

Moreover, the first rib structure 9 is installed at a central part of a surface 14 as the back side of the first member to be welded 1 to which the pressure is applied, which also increases pressure resistance. Furthermore, the height H1 from the back surface of the first member to be welded 1 to the step bottom surface 22 of the second member to be welded 2 is allowed to fall within 0.05 mm, thereby holding the cooling ability when the second member to be welded 2 is used for the cooler. It is also possible to hold the cooling effect by maintaining the height H1 to be constant, for example, when the second member to be welded 2 is used for the cooler. In the welding at the central part, it is desirable that the welding tool 5 is pulled out at a position far from a welding interface. For example, when the first rib structure 9 has a cylindrical shape, pressure resistance is further improved by setting the center of the first rib structure 9 as the position where the welding tool 5 is pulled out.

Figure 8:
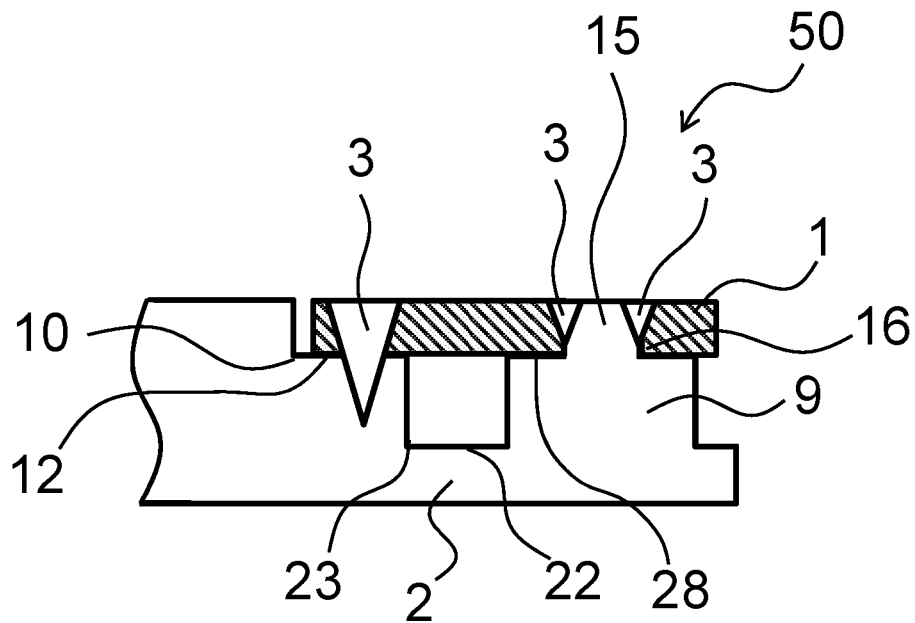
FIG. 8 is a cross-sectional view for explaining the friction stir welding method according to Embodiment 5.

A structure in FIG. 8 is basically the same as that in FIG. 1, in which the first rib structure 9 is provided at a position independent of the first step portion 10 in the second member to be welded 2. Moreover, a protrusion 15 having a height equivalent to a thickness of the plate thickness t1 of the first member to be welded 1 is provided on the first-rib step supporting surface 28 as the upper surface of the first rib structure 9, and an opening 16 is provided in the first member to be welded 1 so that the protrusion 15 can be fitted thereto. The opening 16 may not necessarily a through hole. As shown in FIG. 8, the protrusion 15 of the first rib structure 9 is fitted to the opening 16 of the first member to be welded 1 first and the friction stir welding is performed. After that, the step supporting surface 12 of the first step portion 10 in the second member to be welded 2 and the first member to be welded 1 are welded by friction stir welding along the outline of the first member to be welded 1. In the friction stir welding method shown in FIG. 8, the protrusion 15 is provided in the first rib structure 9 and fitted to the first member to be welded 1, thereby further obtaining an advantage that the first rib structure 9 functions as a positioning pin to facilitate positioning in addition to the above advantages.

Figure 9:
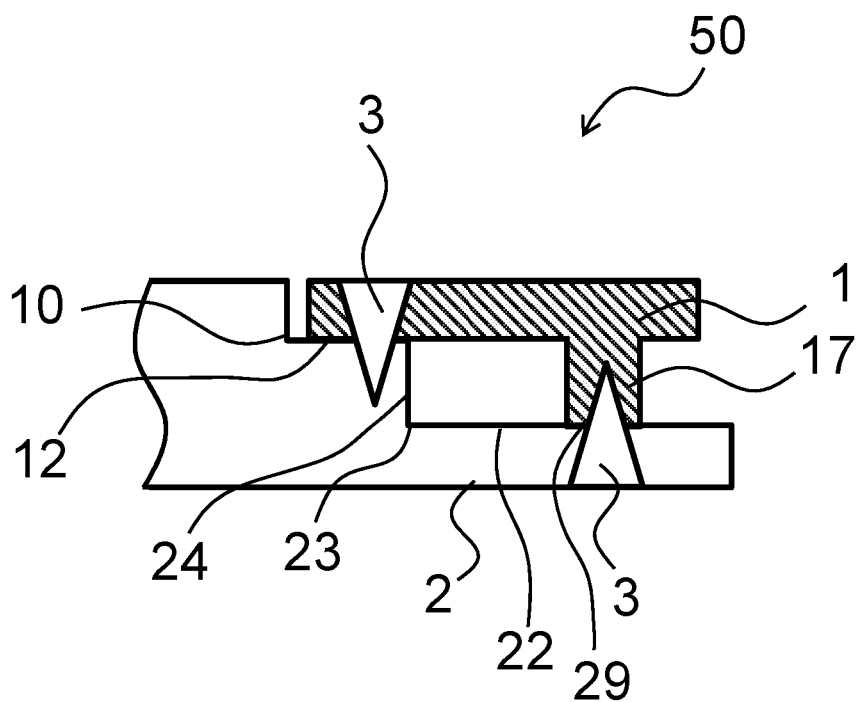
FIG. 9 is a cross-sectional view for explaining the friction stir welding method according to Embodiment 5.

FIG. 9 shows a friction stir welding method for the welding structure 50 having the same advantages as those in FIG. 7, having a structure in which a second rib structure 17 is provided on the first member to be welded 1 side. The second rib structure 17 has, for example, the same height as the height from the step bottom surface 22 to the step supporting surface 12 of the second member to be welded 2. After a second-rib step supporting surface 29 as an upper surface of the second rib structure 17 is made to abut on the step bottom surface 22 of the second member to be welded 2 and friction stir welding is performed from the opposite side of the step bottom surface 22 of the second member to be welded 2, the first member to be welded 1 is lapped over the step supporting surface 12 of the second member to be welded 2 and friction stir welding is performed along the outline of the first member to be welded 1.

Figure 10:
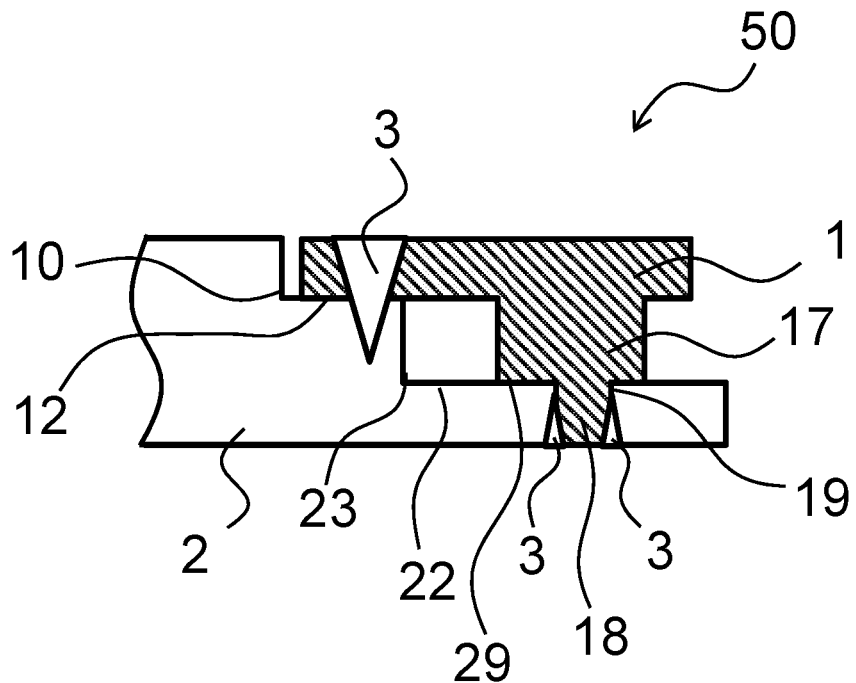
FIG. 10 is a cross-sectional view for explaining the friction stir welding method according to Embodiment 5.

In the welding structure 50 shown in FIG. 10, a convex portion 18 having a height equivalent to a plate thickness in the step bottom surface 22 of the second member to be welded 2 is provided on the second-rib step supporting surface 29 as the upper surface of the second rib structure 17 of the first member to be welded 1, and a concave portion 19 to which the convex portion 18 of the second-rib structure 17 is fitted is provided in the step bottom surface 22 of the second member to be welded 2. As shown in FIG. 10, the convex portion 18 of the second rib structure 17 is fitted to the concave portion 19 of the second member to be welded 2 and friction stir welding is performed from the opposite side of the step bottom surface 22 of the second member to be welded 2, then, the first member to be welded 1 is lapped over the step supporting surface 12 of the second member to be welded 2 and friction stir welding is performed along the outline of the first member to be welded 1.

Embodiment 6

Figure 11:
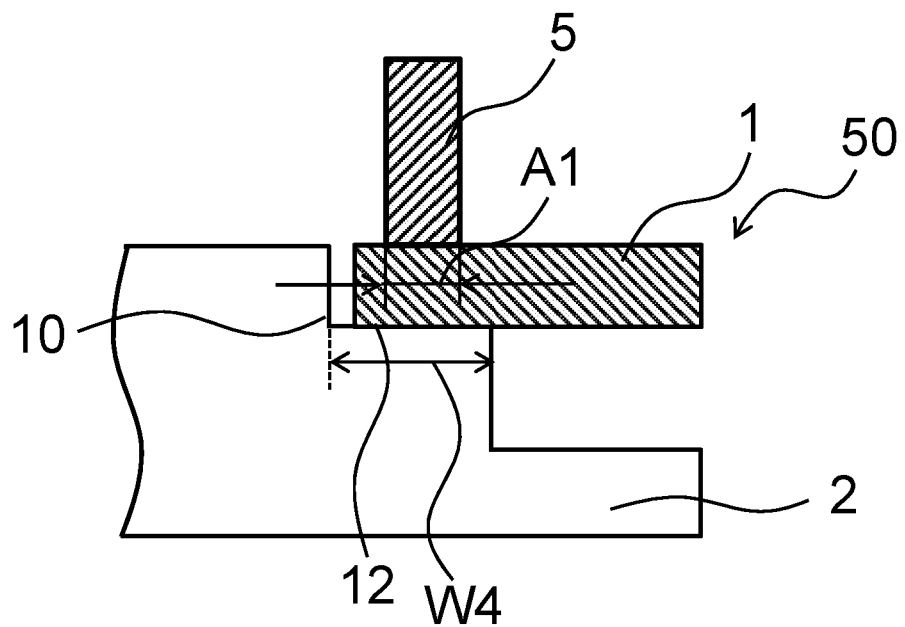
FIG. 11 is a cross-sectional view for explaining a friction stir welding method according to Embodiment 6.

FIG. 11 is a cross-sectional view for explaining a friction stir welding method according to Embodiment 6.

FIG. 11 has the same structure as that in FIG. 1. A tool contact area A1 between the welding tool 5 and the first member to be welded 1 is set to be equal to or lower than a step width W4 of the step supporting surface 12 of the first step portion 10 provided in the second member to be welded 2. When the tool contact area A1 becomes wider than the step width W4 of the step supporting surface 12, it is difficult to hold the shape of the first step portion 10 due to a load added at the time of friction stir welding and abnormal deformation occurs. Accordingly, it is desirable that the tool welding area A1 in which the welding tool 5 contacts the first member to be welded 1 is smaller than the step width W4 of the first step portion 10 provided in the second member to be welded 2.

Figure 12:
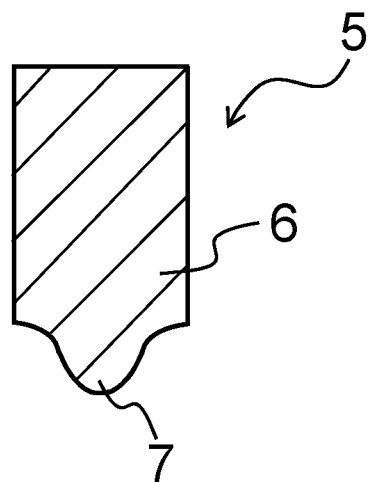
FIG. 12 is a cross-sectional view showing a welding tool used for the friction stir welding method according to Embodiment 6.

FIG. 12 is a cross-sectional view showing a welding tool used for a friction stir welding method according to Embodiment 6. FIG. 12 shows the shape of the welding tool 5 suitable for reducing the tool contact area A1 in which the welding tool 5 contacts the first member to be welded 1 to be lower than the step width W4 provided in the second member to be welded 2. This is a reverse-fillet shaped tool in which a diameter of the probe is increased in a tapered shape from a tip end of the probe 7 toward the shoulder 6 and the probe 7 and the shoulder 6 are connected in a smooth curve. The welding tool 5 having this shape not only reduces the tool contact area A1 but also there is no stress concentration, therefore, strength in the welding tool 5 is improved and the tool is hardly broken. Moreover, friction stir welding can be performed at both insertion positions of a tapered shape part and a smooth curved part, therefore, the tolerance in insertion depth of the welding tool 5 is high and the welding tool 5 can be applied to members to be welded with various plate thicknesses. It is also preferable to provide a thread groove in the tapered shape part. For example, it is desirable that a thread shape with a pitch of 0.3 mm or more and 1.5 mm or less is machined on a curved surface of the tip end of the reverse-fillet shaped tool. As the groove shape, a trapezoidal thread shape or the like is preferably used for reducing stress concentration at a root portion of the groove.

Embodiment 7

Figure 13:
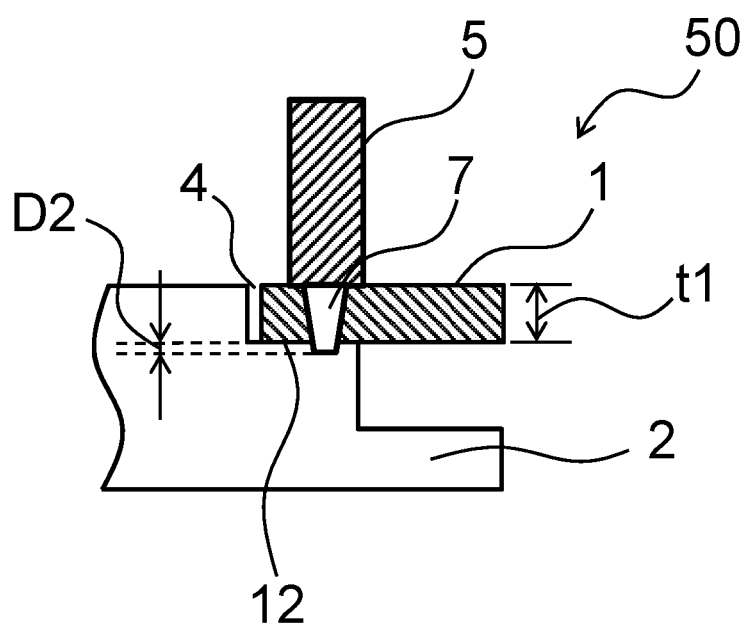
FIG. 13 is a cross-sectional view for explaining a friction stir welding method according to Embodiment 7.

FIG. 13 is a cross-sectional view for explaining a friction stir welding method according to Embodiment 7. FIG. 13 has the same structure as that in FIG. 1. The tip end of the probe 7 is inserted into the step supporting surface 12 of the second member to be welded 2 while controlling the depth to a depth D2 which is 0.01 times or more to 0.3 times or less of the plate thickness t1 of the first member to be welded 1, then, the first member to be welded 1 is lapped over the step supporting surface 12 of the second member to be welded 2 and friction stir welding is performed along the outline of the first member to be welded 1. When the probe 7 is inserted into the second member to be welded 2 deeper than 0.3 times of the plate thickness t1 of the first member to be welded 1, an amount of welding metal to be stirred is increased and it is difficult to sufficiently suppress the welding metal by the welding tool 5 in which the diameter L1 of the shoulder 6 is thin. Accordingly, the friction stir welding with a high aspect ratio is not capable of being performed. When the insertion depth to the second member to be welded 2 becomes smaller than 0.01 times of the plate thickness t1 of the first member to be welded 1, it may be difficult to perform welding and obtain strength due to abrasion or the like of the welding tool 5.

In view of the above, the insertion depth of the welding tool 5 in the second member to be welded 2 at an lapped part between the step supporting surface 12 of the second member to be welded 2 and the first member to be welded 1 is set to 0.01 times or more to 0.3 times or less of the plate thickness t1 of the first member to be welded 1, thereby performing the friction stir welding with a high aspect ratio.

Embodiment 8

Figure 14:
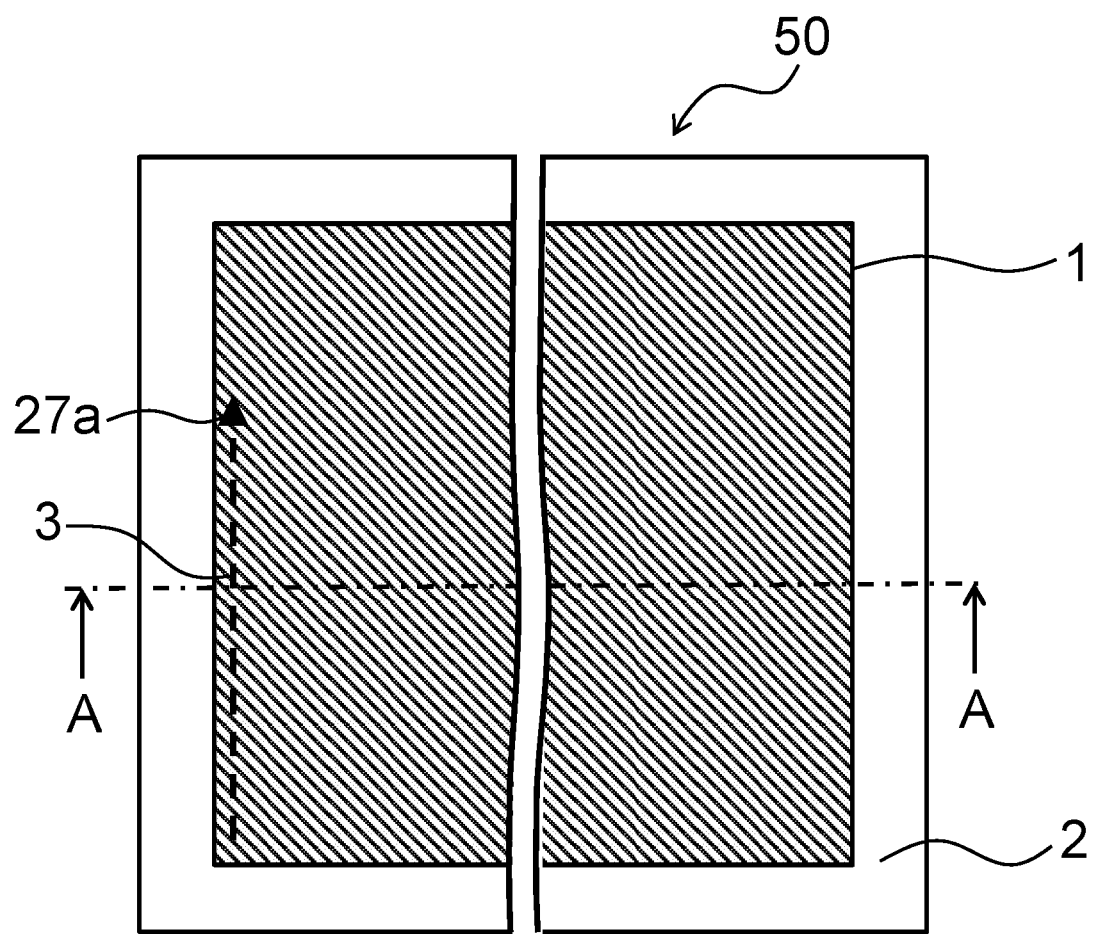
FIG. 14 is a schematic plan view for explaining a friction stir welding method according to Embodiment 8.
Figure 15:
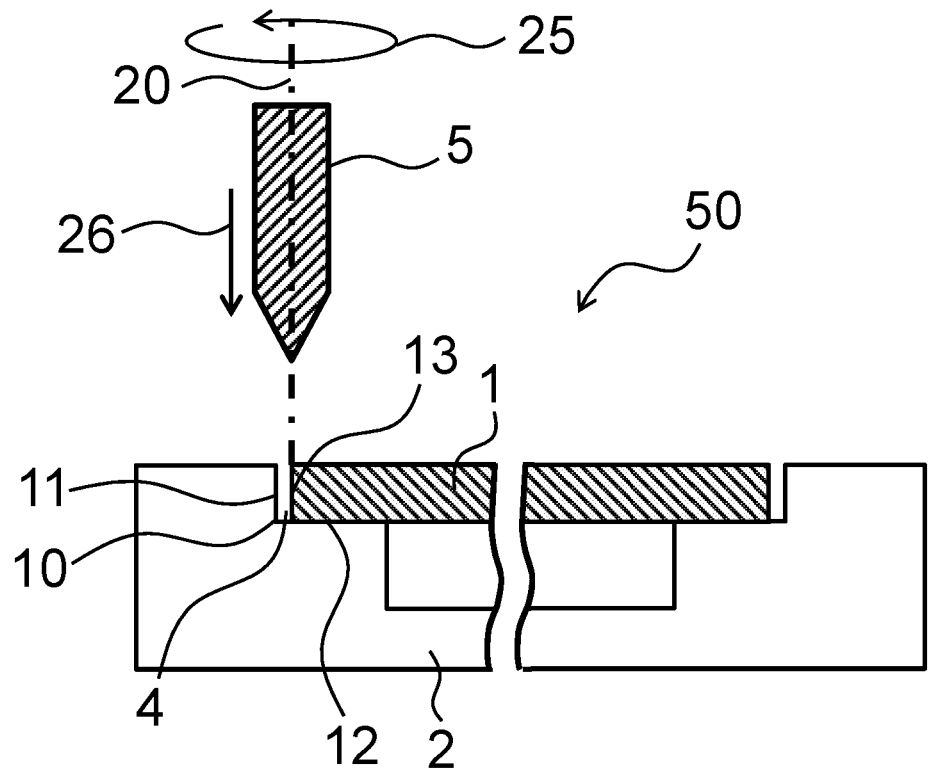
FIG. 15 is a cross-sectional schematic view for explaining the friction stir welding method according to Embodiment 8.
Figure 16:
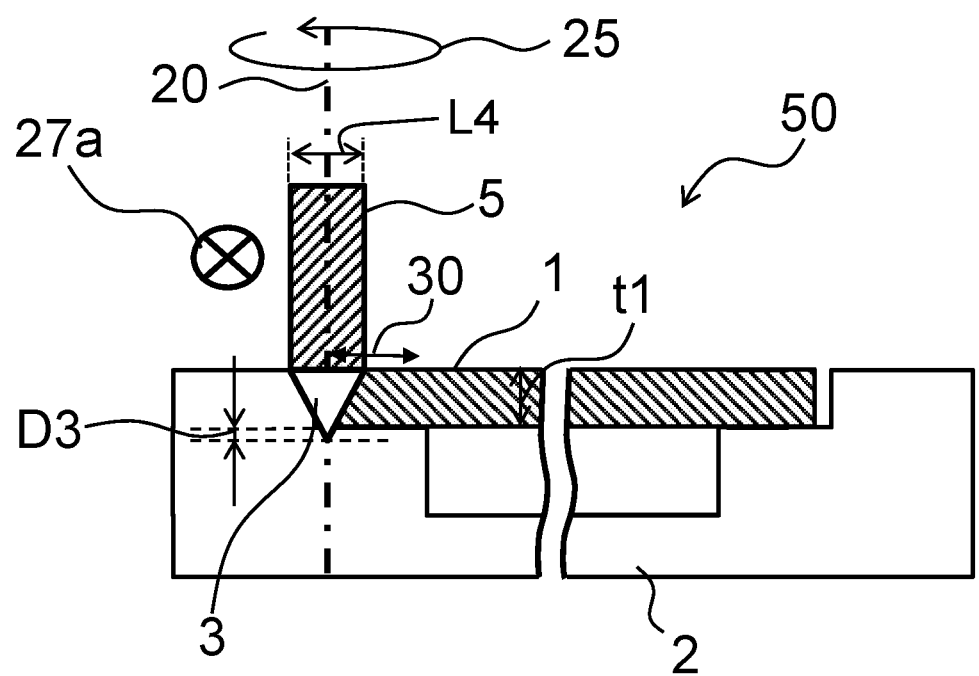
FIG. 16 is a cross-sectional schematic view for explaining the friction stir welding method according to Embodiment 8.

FIG. 14 is a schematic plan view for explaining a friction stir welding method according to Embodiment 8. FIG. 15 and FIG. 16 are cross-sectional schematic views for explaining the friction stir welding method according to Embodiment 8. FIG. 15 shows a state before insertion of the welding tool 5 and FIG. 16 shows a section taken along A-A line of FIG. 14, which is a state during welding. In Embodiment 8, the first member to be welded 1 is a plate component such as a heat sink and the second member to be welded 2 is, for example, a jacket of a box-shaped cooler.

As described above, the welding tool 5 is moved while being rotated along the outline of the first member to be welded 1 to perform friction stir welding at the time of welding the first member to be welded 1 and the second member to be welded 2 by friction stir welding. A side where a tool rotating direction of the welding tool 5 corresponds to a tool moving direction and a side where the tool rotating direction does not correspond to the tool moving direction are formed with respect to a welding line through which the central axis 20 of rotation of the welding tool 5 passes, as a result, welding states become asymmetrical in an inner area and an outer area of the welding line.

Particularly when moving the welding tool 5, shear flow due to friction between the welding tool 5 and the first member to be welded 1 and thermal deformation due to frictional heating occur at the same time near the welding tool 5. The side where the tool rotating direction corresponds to the tool moving direction will be a start point of the shear flow and friction stir occurs in a dominant manner. In the side where the tool rotating direction does not correspond to the tool moving direction, a ratio of thermal deformation due to frictional heating is higher as compared with the shear flow.

In a case where the asymmetric property in the welding states is applied to a butting structure such as the structure between the outline side surface 13 of the first member to be welded 1 and the side surface 11 of the second member to be welded 2, the first member to be welded 1 in the side where the tool rotating direction corresponds to the tool moving direction becomes the start point of the shear flow and friction stir occurs in the dominant manner. In the side where the tool rotating direction does not correspond to the tool moving direction, the ratio in which the first member to be welded 1 is just thermally deformed is higher.

As a result, a state in which the first member to be welded 1 on the side where the tool rotating direction corresponds to the tool moving direction is stirred and mixed is formed with respect to the first member to be welded 1 on the side where the tool rotating direction does not correspond to the tool moving direction of the welding tool 5, then, a ratio of the first member to be welded 1 on the side where the tool rotating direction corresponds to the tool moving direction becomes higher in the friction stir welding part 3 and a welding interface tends to be formed on the side where the tool rotating direction does not correspond to the tool moving direction.

When the above asymmetric property in the welding states is applied to the lapped part such as between the step support surface 12 of the first step portion 10 and the plate-shaped first member to be welded 1 arranged thereon, the ratio of thermal deformation becomes high on the side where the tool rotation direction does not correspond to the tool moving direction, and winding in which the second member to be welded 2 on the lapped lower side is not stirred and rises due to thermal deformation easily occurs and a non-welded part is elongated, which may incur deterioration in welding quality.

In view of the above, in Embodiment 8, when the plate-shaped first member to be welded 1 is lapped over the first step portion 10 of the second member to be welded 2 and the friction stir welding is performed along the outline of the first member to be welded 1, a tool rotating direction 25 is allowed to be the same as a tool moving direction 27a of the welding tool 5 within an inner area 30 of the welding line as shown in FIG. 14 to FIG. 16. Accordingly, the welding structure 50 in which the non-welded part tending to be a start point of a crack is small in the inner area 30 of the welding line having a large load after welding and welding strength is high can be obtained. In Embodiment 8, the gap 4 is provided between the side surface 11 of the first step portion 10 formed in the second member to be welded 2 and the outline side surface 13 of the first member to be welded 1 in the same manner as Embodiment 1.

Specifically, as shown in FIG. 14 to FIG. 16, the first member to be welded 1 is lapped over the second member to be welded 2, and the welding tool 5 is inserted into the first member to be welded 1 in a tool insertion direction 26 while rotating the welding tool 5 in the tool rotating direction 25 (counterclockwise). Then, the welding tool 5 is moved in the tool moving direction 27a (from the near side to the far side of the paper) along the outline of the first member to be welded 1 while rotating the welding tool 5 in the tool rotating direction 25 (counterclockwise), welding the first member to be welded 1 and the second member to be welded 2 by friction stir welding to form the friction stir welding part 3. As the tool rotating direction 25 and the tool moving direction 27a of the welding tool 5 are the same direction in the inner area 30 of the welding line in Embodiment 8, the welding structure 50 in which the non-welded part tending to be the start point of the crack is small in the inner area 30 of the welding line having a large load after welding and welding strength is high can be obtained.

Furthermore, a lapped welding structure in which the central axis 20 of the rotating welding tool 5 is arranged near the outline side surface 13 of the first member to be welded 1 and the side surface 11 of the first step portion 10 of the second member to be welded 2 and the outline side surface 13 of the first member to be welded 1 are included in a partial butting structure is adopted, thereby forming the rigid welding structure 50 with no defect and non-welded part from a step-lapped welding surface to the step side surface and having a long welding interface.

Specifically, in the stirring step, the welding tool 5 is inserted to the first member to be welded 1 or the second member to be welded 2 so that a length from the central axis 20 of rotation of the welding tool 5 to the outline side surface 13 of the first member to be welded 1 is in a range from 0 times or more to 1.0 times or less of an outer diameter L4 of the welding tool 5 in the direction of the inner area 30.

Namely, the welding tool 5 is inserted to the first member to be welded 1 or the second member to be welded 2 in a range from a position where the central axis 20 of rotation of the welding tool 5 corresponds to an axis of the outline side surface 13 of the first member to be welded 1 to a position 1.0 times or less of the outer diameter L4 of the welding tool 5 to the inner area 30 side.

Moreover, the welding tool 5 is inserted while controlling an insertion depth D3 from the step supporting surface 12 of the second member to be welded 2 in a depth 0.01 times or more to 0.3 times or less of the plate thickness t1 of the first member to be welded 1. Then, the welding tool 5 is moved along the outline of the first member to be welded 1 so that the tool moving direction 27a corresponds to the tool rotating direction 25 in the inner area 30 of the first member to be welded 1 while keeping the above position, and the first member to be welded 1 and the second member to be welded 2 are welded by the friction stir welding.

Also in the friction stir welding method according to Embodiment 8, a screw in a reverse direction to the tool rotating direction 25, namely, a positive screw is provided in the welding tool 5 when the welding tool 5 rotates counterclockwise and a reverse screw is provided in the welding tool 5 when the welding tool 5 rotates clockwise, thereby obtaining further higher effects.

Embodiment 9

Figure 17:
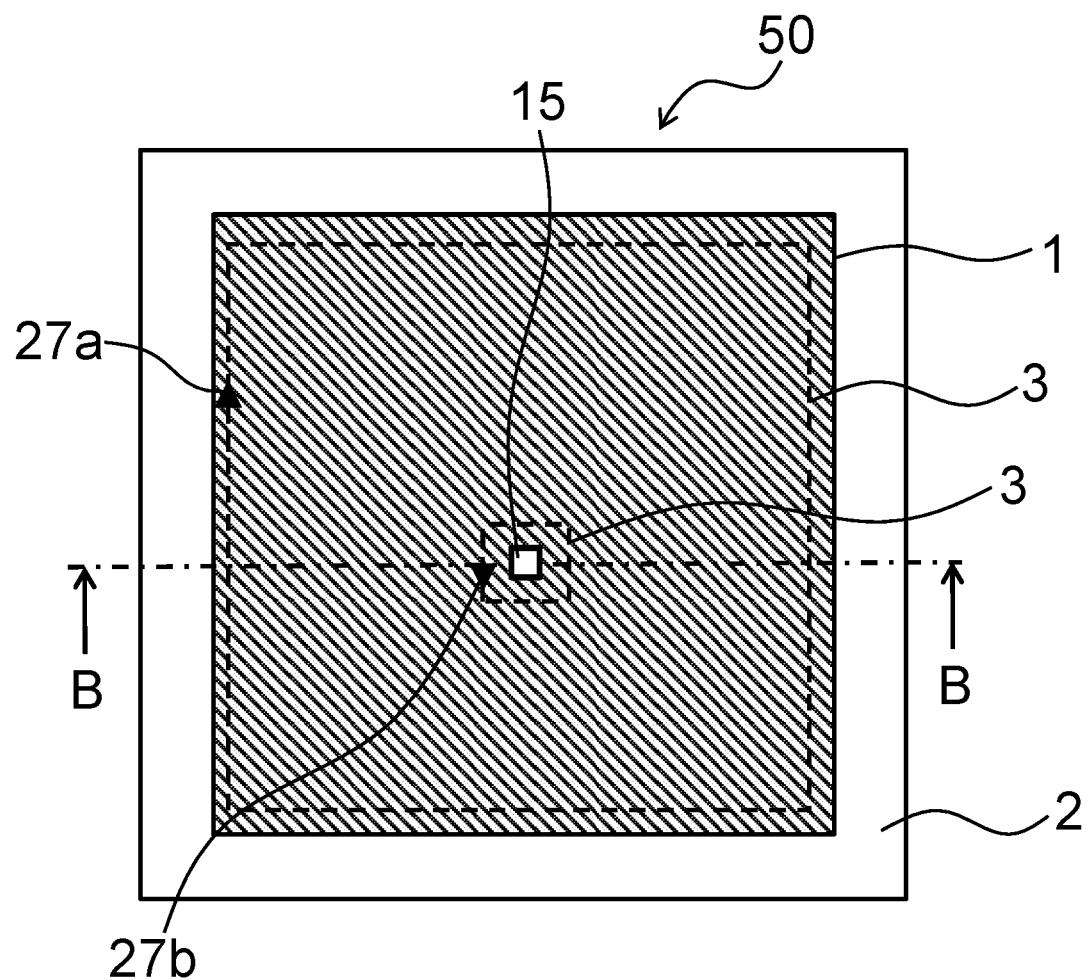
FIG. 17 is a schematic plan view for explaining a friction stir welding method according to Embodiment 9.
Figure 18:
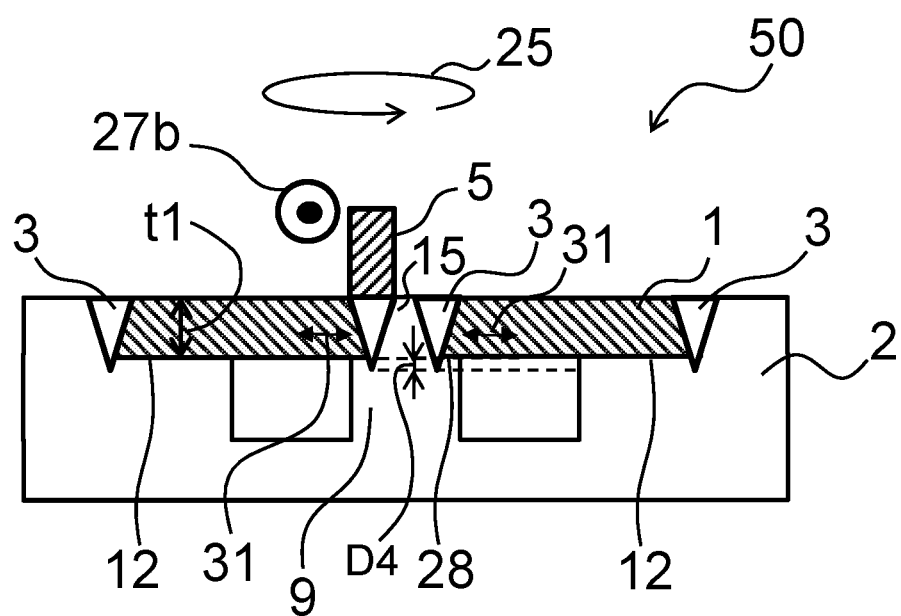
FIG. 18 is a cross-sectional schematic view for explaining the friction stir welding method according to Embodiment 9.

FIG. 17 is a schematic plan view for explaining a friction stir welding method according to Embodiment 9. FIG. 18 is a cross-sectional view showing a section taken along B-B line of FIG. 17. In Embodiment 9, the friction stir welding method concerning the welding structure 50 provided with the first rib structure 9 or the second rib structure 17 in the first member to be welded 1 or the second member to be welded 2 will be shown as shown in FIG. 7, FIG. 8, FIG. 9 and FIG. 10.

FIG. 17 shows a friction stir welding method concerning the welding structure 50 provided with the first rib structure 9 in the first member to be welded 1 shown in FIG. 8. As described above, the members to be welded are welded together by moving the welding tool 5 while being rotated in the friction stir welding, therefore, the asymmetric property in welding states is formed along the welding line depending on the tool rotating direction of the welding tool 5 with respect to the tool moving direction.

Accordingly, the lapped welding structure in which the tip end of the welding tool 5 is inserted deeper than the first-rib step supporting surface 28 is adopted at the time of performing friction stir welding of the second member to be welded 1 having the first rib structure 9 as show in FIG. 17 and FIG. 18. The friction stir welding is performed to a rib-outer peripheral side 31 of the first rib structure 9 so that the tool rotating direction (counterclockwise) 25 of the welding tool 5 and a tool moving direction 27b (from the far side to the near side of the paper) are the same direction.

Specifically, in the friction stir welding between the first-rib step supporting surface 28 of the first rib structure 9 and the first member to be welded 1, the friction stir welding is performed while the welding tool 5 keeps an insertion depth D4 from the first-rib step supporting surface 28 in a depth 0.01 times or more to 0.3 times or less of the plate thickness t1 of the first member to be welded 1 as the plate-shaped component so that the tool moving direction 27b (from the far side to the near side of the paper) corresponds to the tool rotating direction 25 (counterclockwise) in the rib-outer peripheral side 31. As a large load is applied to the rib-outer peripheral side 31 in the first rib structure 9, the strength is largely improved by using the above friction stir welding method. The tool rotating direction and the tool moving direction of the welding tool 5 are allowed to the same direction on the side where the load becomes high also in portions other than the first rib structure 9, improvement in welding strength can be expected.

In Embodiment 9, explanation has been made based on FIG. 8 as a representative of the friction stir welding method of the welding structure 50 provided with the first rib structure 9 or the second rib structure 17 respectively in the first member to be welded 1 or the second member to be welded 2. Also in FIG. 10, the lapped welding structure in which the tip end of the welding tool 5 is inserted to be deeper than the second-rib step supporting surface 29 is adopted at the time of performing friction stir welding of the first member to be welded 1 having the second rib structure 17, and the friction stir welding is performed to the rib-outer peripheral side 31 of the second rib structure 17 so that the tool rotating direction and the tool moving direction of the welding tool 5 are the same direction. Also in the friction stir welding method with respect to the welding structure 50 shown in FIG. 10, welding is performed while the welding tool 5 keeps the insertion depth from the second-rib step supporting surface 29 in a depth 0.01 times or more to 0.3 times or less of the plate thickness t1 of the first member to be welded 1 so that the tool rotating direction corresponds to the tool moving direction in the rib-outer peripheral side 31 in the friction stir welding between the second-rib step supporting surface 29 of the second rib structure 17 and the second member to be welded 2.

As described above, the welding structure 50 is manufacture by the friction stir welding by using the friction stir welding method according to Embodiment 1 to Embodiment 9.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST 1 first member to be welded, 2 second member to be welded, 3 friction stir welding part, 4 gap, 5 welding tool, 6 shoulder, 7 probe, 8 space, 9 first rib structure, 10 first step portion, 11 side surface, 12 step supporting surface, 13 outline side surface, 14 surface to which pressure is applied, 15 protrusion, 16 opening, 17 second rib structure, 18 convex portion, 19 concave portion, 20 central axis, 21 groove portion, 22 step bottom surface, 23 second step portion, 24 step wall surface, 25 tool rotating direction, 26 tool insertion direction, 27a tool moving direction, 27b tool moving direction, 28 first-rib step supporting surface, 29 second-rib step supporting surface, 30 inner area, 31 rib-outer peripheral side, 50 welding structure

The invention claimed is:

1. A friction stir welding method in which a first member to be welded formed of metal or resin and a second member to be welded formed of metal or resin and having a first step portion are arranged in a lapped manner and welded by friction stir welding using a welding tool, comprising the steps of:
arranging the first member to be welded on a step supporting surface of the first step portion with a gap between the first member to be welded and a side surface of the first step portion;
pushing the welding tool into the first member to be welded from a surface on the opposite side of a back surface of the first member to be welded contacting the step supporting surface while rotating the welding tool and inserting the welding tool until reaching the step supporting surface of the second member to be welded; and
stirring the first member to be welded and the second member to be welded by rotating the welding tool to form a welding part,
wherein the first member to be welded is a plate-shaped component,
a width of the gap is 0.03 times or more to 0.2 times or less of a plate thickness of the first member to be welded,
a welding width of the welding part formed on the surface of the first member to be welded is 0.5 times or more to twice or less of the plate thickness of the first member to be welded.

2. The fiction stir welding method according to claim 1, wherein
the welding tool is inserted at a position where a length from a central axis of the welding tool to an outline side surface of the first member to be welded is within a range of lengths 0.5 times or more to 1.0 times or less of the plate thickness of the first member to be welded in the stirring step, which moves along an outline of the first member to be welded while keeping the position.

3. The fiction stir welding method according to claim 1, wherein a space in which a width is 0.5 times or more to 1.0 times or less of the plate thickness of the first member to be welded and a depth is 0.3 times or more to 0.8 times or less of the plate thickness of the first member to be welded is provided on the back surface of the first member to be welded along the outline of the first member to be welded, and
the first member to be welded is lapped over the second member to be welded and welding is performed along the space.

4. A manufacturing method of a welding structure using the fiction stir welding method according to claim 1, comprising the step of:
removing an upper surface of the welding part along the welding part so that 60% to 95% of the plate thickness of the first member to be welded remains after the first member to be welded is lapped over the step supporting surface of the second member to be welded and welding is performed to form a groove portion along the welding part of the first member to be welded.

5. A manufacturing method of a welding structure using the fiction stir welding method according to claim 1, in which the second member to be welded includes a second step portion provided at an end portion of the step supporting surface and having a step wall surface and a step bottom surface, and the second member to be welded has a first rib structure on the step bottom surface independent of the step supporting surface, the method comprising the steps of:
arranging the first member to be welded on a first-rib step supporting surface as an upper surface of the first rib structure and the step supporting surface; and
welding the step supporting surface of the second member to be welded and the first member to be welded along the outline of the first member to be welded after the first member to be welded is lapped over the first-rib step supporting surface of the first rib structure and welding is performed.

6. The manufacturing method of the welding structure according to claim 5,
wherein a protrusion having a height equivalent to a thickness of the plate thickness of the first member to be welded is provided on an upper surface of the first-rib step supporting surface of the second member to be welded,
an opening to which the protrusion is fitted is provided on the first member to be welded, and
the first member to be welded is lapped over the step supporting surface of the second member to be welded and welding is performed along the outline of the first member to be welded after the protrusion is fitted to the opening of the first member to be welded and welding is performed.

7. A manufacturing method of a welding structure using the friction stir welding method according to claim 1, in which the second member to be welded includes a second step portion provided at an end portion of the step supporting surface and having a step wall surface and a step bottom surface, and the first member to be welded has a second rib structure having a height equivalent to a height from the step bottom surface to the step supporting surface of the second member to be welded, the method comprising the step of:
welding the step supporting surface of the second member to be welded and the first member to be welded along the outline of the first member to be welded after a second-rib step supporting surface as an upper surface of the second rib structure is made to be abut on the step bottom surface of the second member to be welded and welding is performed from the opposite side of the step bottom surface.

8. The manufacturing method of the welding structure according to claim 7,
wherein a convex portion having a height equivalent to a plate thickness in the step bottom surface of the second member to be welded is provided on an upper surface of the second-rib step supporting surface of the first member to be welded,
a concave portion to which the convex portion is fitted is provided in the step bottom surface of the second member to be welded, and
the step supporting surface of the second member to be welded and the first member to be welded are welded together along the outline of the first member to be welded after the convex portion is fitted to the concave portion of the second member to be welded and welding is performed.

9. A manufacturing method of a welding structure using the friction stir welding method according to claim 1,
wherein a tool contact area of the welding tool contacting the first member to be welded is smaller than a width of the step supporting surface provided along an outline of the second member to be welded.

10. A manufacturing method of a welding structure using the friction stir welding method according to claim 1,
   wherein a reverse-fillet shaped tool in which a diameter of a probe of the welding tool is increased in a tapered shape from a tip end of the probe toward a shoulder and the probe and the shoulder are connected in a smooth curve is used.

11. The manufacturing method of the welding structure according to claim 10,
   a thread shape with a pitch of 0.3 mm or more and 1.5 mm or less is machined on a curved surface of the tip end of the reverse-fillet shaped tool.

12. The manufacturing method of the welding structure according to claim 10,
   wherein the tip end of the probe is inserted into the step supporting surface of the second member to be welded while controlling a depth in a depth 0.01 times or more to 0.3 times or less of the plate thickness of the first member to be welded, and
   the outline of the first member to be welded is lapped over the second member to be welded and welding is performed.

13. The manufacturing method of the welding structure according to claim 5,
   wherein, in friction stir welding between the first-rib step supporting surface of the first rib structure and the first member to be welded, the welding tool is moved so that a tool moving direction corresponds to a tool rotating direction in a rib-outer peripheral side while keeping an insertion depth from the first-rib step supporting surface in a depth 0.01 times or more to 0.3 times or less of the plate thickness of the first member to be welded.

14. The manufacturing method of the welding structure according to claim 7,
   wherein, in friction stir welding between the second-rib step supporting surface of the second rib structure and the second member to be welded, the welding tool is moved so that a tool moving direction corresponds to a tool rotating direction in a rib-outer peripheral side while keeping an insertion depth from the second-rib step supporting surface in a depth 0.01 times or more to 0.3 times or less of the plate thickness of the first member to be welded.

* * * * *